United States Patent [19]
Lacey

[11] 3,796,233
[45] Mar. 12, 1974

[54] HOSE SPLICING APPARATUS
[76] Inventor: Edward H. Lacey, P.O. Box 796, Trent, S. Dak. 57065
[22] Filed: Mar. 1, 1972
[21] Appl. No.: 230,635

[52] U.S. Cl. .................................. 138/97, 138/155
[51] Int. Cl. ............................................. F16l 55/18
[58] Field of Search ................. 138/97, 98, 99, 155; 220/24.5; 166/187

[56] References Cited
UNITED STATES PATENTS
1,180,714   4/1916   Hall ..................................... 138/97
2,843,154   7/1958   Hosking ............................. 220/24.5

Primary Examiner—James J. Gill
Assistant Examiner—Anthony V. Ciarlante
Attorney, Agent, or Firm—Clarence A. O'Brien; Harvey B. Jacobson

[57] ABSTRACT
A portable, self-contained apparatus for use in repairing and splicing flexible hoses such as cord reinforced hoses employed in irrigation systems with the apparatus including an inflatable member, a compressed air tank and control valves for inflating and deflating the inflatable member with all of these components being disposed interiorly of the hose when repairing or splicing the same with the control valves being operable exteriorly of the hose by deflecting a portion of the periphery of the hose for manipulating the control valves.

The apparatus also includes a metallic body that forms a core for an electromagnet with the metallic body being disposed interiorly of the hose and connected to the compressed air tank and the winding of the electromagnet being disposed exteriorly of the hose in encircling relation thereto whereby the apparatus may be moved relative to the hose while disposed in the interior thereof to facilitate proper orientation of the apparatus in the hose during the repairing and splicing operation.

10 Claims, 6 Drawing Figures

PATENTED MAR 12 1974  3,796,233
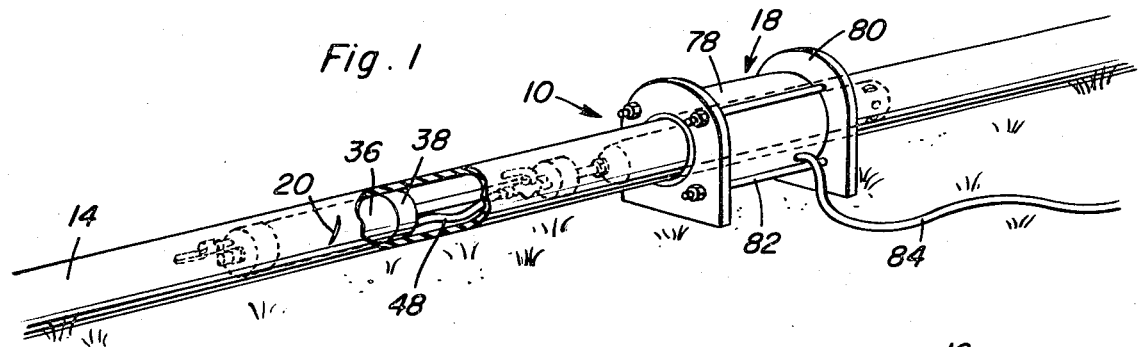
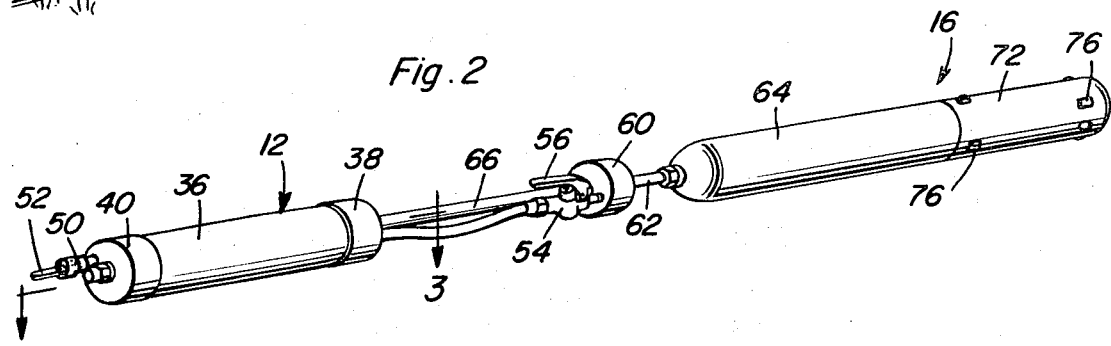
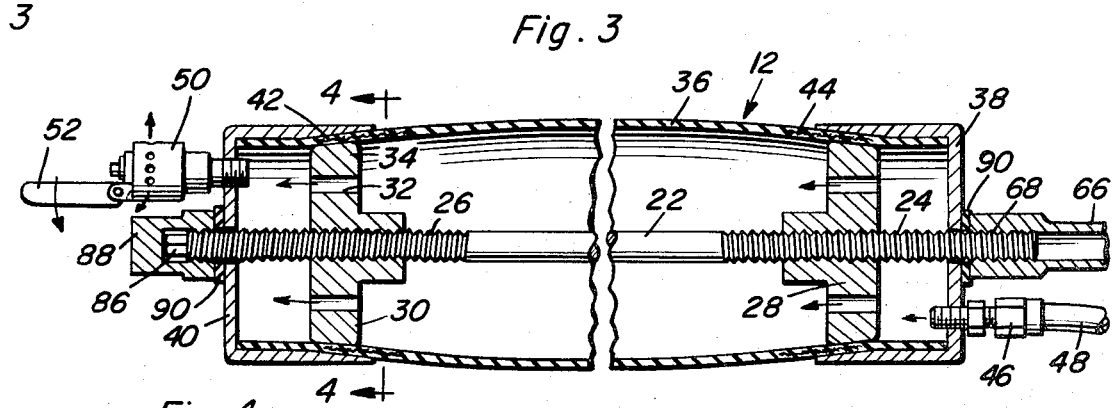
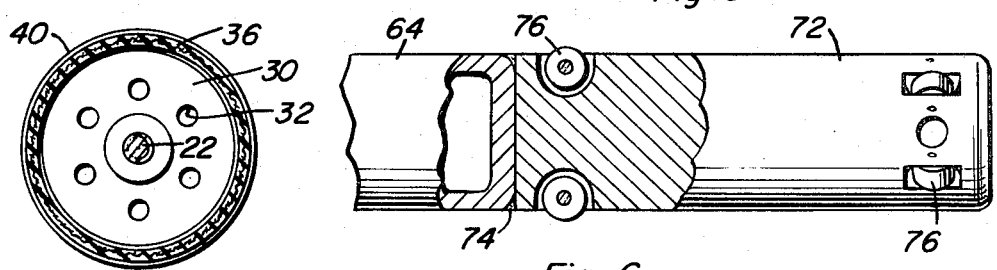
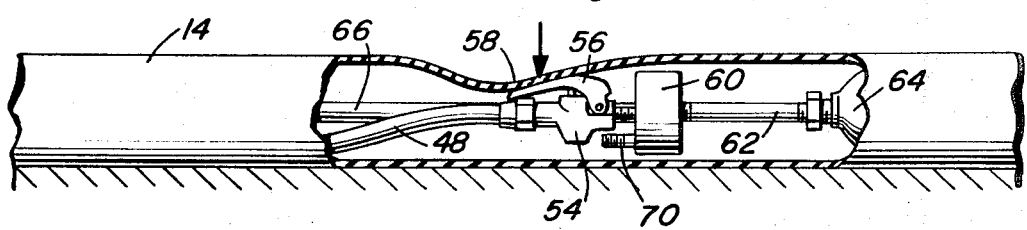

HOSE SPLICING APPARATUS

CROSS REFERENCE TO RELATED APPLICATIONS

This application discloses improvements in the apparatus disclosed in my copending application Ser. No. 88,420 filed Nov. 10, 1970 now U.S. Pat. No. 3,666,586, issued May 30, 1972 which is a continuation-in-part of Ser. No. 874 filed Jan. 6, 1970, now abandoned.

BACKGROUND OF THE INVENTION

1. Field of the Invention

The present invention generally relates to an apparatus for use in repairing or splicing damaged mobile pipe or hose used in the irrigation of fields and more particularly includes an internally disposed, inflatable and expandable member that is self-contained and movable within the hose.

2. Description of the Prior Art

In certain types of irrigation apparatuses, relatively long flexible hoses are employed with the hoses having a relatively large diameter. Such hoses have considerable tension imparted thereto during the irrigation procedure and it frequently becomes necessary to repair or splice a damaged hose. Due to the internal pressures encountered and the tension forces imparted to the hose, it has been found necessary to utilize an internal device for applying internal pressure to the inner periphery of the hose in order to cure the repair or splicing materials whether the repair or splicing is done by a vulcanizing process or a chemical method such as by using a plastic putty type material. In order for the repairing or splicing process to be properly conducted, the inner periphery of the walls of the hose must be retained outwardly against a steam chest surrounding the hose in the vulcanizing method or against a sleeve or rigid tube in the chemical process so that the repair material would be under compression and cure into a solid, non-porous mass so that the repair makes the hose continuous and serviceable with the repair or splice material retaining substantially the same degree of flexibility as the original hose and also maintaining the strength characteristics of the remainder of the hose which is accomplished by connecting the cord reinforcement in the hose by utilizing non-slip knots for securing the cord reinforcement hoses together as disclosed in my copending application Ser. No. 88,420 filed Nov. 10, 1970 for "Cord Reinforced Hose Splicing Method."

While previously known methods such as that disclosed in my copending application are satisfactory, the manner in which the inflatable member is disposed in the hose, inflated and deflated and the manner of transport of the device rendered the apparatus disclosed therein somewhat time-consuming.

SUMMARY OF THE INVENTION

An object of the present invention is to provide a portable, self-contained hose splicing apparatus in which the inflatable, expandable device is connected to a compressed air tank which is disposed interiorly of the hose along with the inflatable device with control valves for inflating and deflating the device also being disposed interiorly of the hose with lateral deflection of the hose enabling manual manipulation of the control valves.

Another object of the invention is to provide a hose splicing apparatus in which a metallic body is connected with the inflatable device, preferably as an extension to the compressed air tank, which forms a core for an electromagnet that is externally received on the hose so that relative movement between the hose and electromagnet will cause corresponding relative movement between the hose and the apparatus disposed interiorly of the hose so that the apparatus and electromagnet can remain stationary while the hose is pulled therethrough or the hose can remain stationary while the apparatus and electromagnet are moved longitudinally thereon thereby enabling the apparatus to be inserted into the hose from one end thereof and moved to a point where repair is necessary or enabling severed ends of the hose to be spliced and the splicing apparatus then moved longitudinally in relation to the hose out of one end thereof which is a significant feature when considering that the hose may be several hundred feet in length and the repair or splice may be somewhere near the center thereof.

A further object of the invention is to provide a hose splicing apparatus in which the inflatable, expandable member is constructed in a manner to enable easy disassembly and assembly thereof to facilitate replacement of the flexible, tubular resilient member which is actually expanded against the inner periphery of the hose to enable replacement of this component of the apparatus when necessary.

Still another feature of the present invention is to provide a hose splicing apparatus which is capable of use in the field as well as in the shop or in the factory where imperfections, weak spots or ruptures which occur during the manufacturing procedure can be repaired. The portability of the device enables it to be easily transported to the site of the hose rupture for repair of the hose without necessitating removal of the hose from the field and transporting it to a shop or the like.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the hose splicing apparatus of the present invention with portions of the hose being broken away.

FIG. 2 is a perspective view of the portion of the apparatus which is disposed interiorly of the hose.

FIG. 3 is a longitudinal, sectional view taken substantially upon a plane passing along section line 3—3, on an enlarged scale, illustrating the specific structural details of the inflatable member.

FIG. 4 is a transverse, sectional view taken substantially upon a plane passing along section 4—4 of FIG. 3 illustrating further structural details of the expandable member.

FIG. 5 is a fragmental sectional view illustrating the roller construction incorporated into the metal body forming an extension of the compressed air tank.

FIG. 6 is a fragmental sectional view of the hose with the apparatus inserted therein illustrating the manner in which the control valves for the inflatable member are manipulated by deflecting the hose.

DESCRIPTION OF THE PREFERRED EMBODIMENT

Referring now specifically to the drawings, the hose splicing apparatus is generally designated by the numeral 10 and includes an inflatable and expandable device 12 that is inserted interiorly of a hose 14 to be repaired or spliced. The apparatus 10 also includes a compressed air tank assembly 16 that is connected with the inflatable and expandable member 12 and is also disposed interiorly of the hose 14. Disposed exteriorly of the hose 14 is an electromagnet 18 that is disposed in encircling relation to the hose 14. The hose 14 is a conventional hose such as a cord reinforced rubber or plastic hose employed in the irrigation of fields and such hoses are normally provided in lengths of 660 feet. When the hose 14 becomes ruptured or damaged, it is necessary to either repair the ruptured area or cut out a damaged area and splice the adjacent ends of the hose. A rupture 20 is illustrated in the hose and depending upon the nature of the rupture or damage, either a repair is made or the hose is severed with the ruptured or damaged portion removed and the ends thereof joined together by splicing. Where abutting ends of the hose are to be spliced, the method disclosed in my copending application Ser. No. 88,420 may be employed for splicing the two ends of the hose together with the apparatus 10 being employed to effect curing of the splice or repair.

The external diameter of the inflatable device 12 and the compressed air tank assembly 16 are such that they are slightly smaller than the internal diameter of the hose 14 for longitudinal movement therein with the inflatable member 12 expanding into engagement with the interior of the hose during the repair or splicing operation.

The inflatable member includes an elongated centrally disposed rod 22 having right-handed threads 24 on one end and left-handed threads 26 on the other. Threaded onto the right-handed threads 24 is an end member 28 and threaded onto the left-handed threads 26 is an end member 30 with the end nenbers generally being in the form of plates having a plurality of apertures 32 therethrough and having a conical or tapered peripheral surface 34 that has the smallest diameter disposed longitudinally outwardly from the center of the rod 22. Surrounding the end members 28 and 30 is a cylindrical, flexible, tubular member 36 of resilient material such as rubber or plastic with the ends thereof extending beyond the end members 28 and 30. A pair of cylindrical cup-shaped end members or caps 38 and 40 are received on the ends of the rod 22 with the inner surfaces of the cup-shaped members 38 and 40 being beveled or tapered as at 42 generally at the same angle of taper as the peripheral surface 34 of the end members 28 nd 30. The cup-shaped members 38 and 40 cooperate with the peripheral surface 34 to sealingly clamp the ends of the tubular member 36 therebetween. The portion of the tubular member which is clamped and that portion which extends beyond the tapered end of the end caps is reinforced with a cord fabric or mesh material 44 so that the tubular member 36 is effectively reinforced to extend its life expectancy and to prevent blow-outs in this area.

The end cap 38 is provided with an inlet fitting 46 having a high pressure hose 48 connected thereto and the end cap 40 is provided with a combined pressure relief and discharge valve 50 which has a pivotally mounted actuating handle 52 connected thereto by which the valve 50 may be manually opened to discharge air from the inflatable member 12 with the pressure relief valve assuring that pressure in the inflatable member will not exceed a predetermined maximum. The high pressure hose 48 is communicated with an inlet valve 54 that includes a longitudinally extending operating handle 56 to control inlet of air into the inflatable device 12 by deflecting the hose 14 as at 58 as illustrated in FIG. 6. The valve 54 is rigidly connected to a manifold block 60 which has a transverse air passage therein which is communicated with the valve 54. The block 60 is rigidly connected to the valve 54 on one side and rigidly connected with a pipe nipple 62 on the other with the pipe nipple being rigidly connected to a cylindrical compressed air tank 64 which forms part of the assembly 16. Also, the block 60 is rigidly attached to a rigid connecting member 66 that has an internally threaded opposite end threaded onto the rod 22 as at 68. In addition, the block 60 is provided with a snifter valve 70 communicating with the air passage therein for enabling compressed air to be supplied to the tank 64 from a suitable high pressure source. The valve 70 is of conventional construction similar to the type employed in inflating pneumatic inner tubes and the like. Thus, the tank 64, block 60 and inflatable device 12 are all rigidly interconnected and disposed in aligned relation.

Rigidly fixed to the end of the compressed air tank 64 is a cylindrical metal body 72 which is substantially the same diameter as the tank 64 and secured thereto in any suitable manner such as by welding 74 or the like. The block 72 has a plurality of circumferentially spaced rollers 76 adjacent each end thereof which have a periphery that projects slightly beyond the surface of the body 72 so that the relatively heavy metal body 72 will be supported from the interior of the hose 14 by the rollers 76 thus reducing the frictional drag of the assembly 16 and the inflatable member 12 as it moves through the hose 14. The metal body 72 forms a core for the electromagnet 18 which has a winding 78 thereon and end plates 80 interconnected by rods or tie bolts 82. The winding 78 is connected with a source of electrical energy through a suitable conductor 84 so that when the winding 78 is energized, the magnetic field produced thereby will retain the metal body 72 which is constructed of ferrous material in stationary relation with respect to the electromagnetic field and stationary with respect to the electromagnet 18. Thus, an elongated hose may be repaired or spliced by initially placing the inflatable member and compressed air tank assembly inside of the hose 14 with the hose 14 previously being inserted into the electromagnet 18. The electromagnet is moved longitudinally out of the way while the repair or splice is being made after which the electromagnet is moved to a position in alignment with the body 72 and energized so that the hose and the electromagnet, inflatable device and air tank assembly may move in relation to each other.

As illustrated in FIG. 3, the rod 22 opposite from its attachment point 68 is square or polygonal as at 86 for enabling the rod to be rotated and a cup-shaped retaining nut 88 is screw threaded onto the left-handed threads 26 and a suitable seal 90 is provided between the nut 88 and the end cap 40 and a similar seal is provided between the end cap 38 and the adjacent end of the rigid member 66.

In assembly, the end members 28 and 30 are threaded inwardly toward each other on the rod 22 and this assembly is then inserted into the tubular member 36. The end caps 38 and 40 are then inserted over the end of the tubular member 36 and forced inwardly until the tapered surfaces 42 frictionally grip the tubular member 36. This device is then positioned in a suitable jig which engages the outermost end surfaces of the end caps 38 and 40 to prevent them from moving apart and then the rod 22 is rotated, by engaging a wrench with the end 86, in a direction to spread the end members 30 and 28 apart thus securely clamping and sealing the tubular member between the end caps and the end members. This assembled unit is then attached to the rigid member 66 by using a suitable wrench to rotate the end 22 to effect the threaded connection 68. Then, the cap nut 88 is threaded in a counterclockwise direction onto the threaded end 26 to provide the assembled unit. The assembled unit is inserted into the interior of the hose where the hose has been severed if a splice is to be made or inserted into the end of the hose if only a patch or repair is to be made on a relatively small rupture such as the rupture 20 illustrated in FIG. 1. The hose is also inserted through the electromagnet and hereagain if the hose is severed for splicing, the electromagnet would be placed on the hose adjacent the point of splicing. If a small rupture is to be repaired, then the electromagnet also would be placed over the end of the hose. When inserted over the end of the hose, the hose may be inserted completely on one reel with only a small length of hose being unreeled for insertion of the assembly 12 and 16 and positioning of the electromagnet thereover and then the free end of the hose may be wound on another reel leaving only a relatively short linearly straight portion of the hose that is pulled through the electromagnet which is energized to retain the constant relation between the electromagnet and the assemblies 12 and 16. After the repaired area has been reached, the electromagnet may be de-energized and moved longitudinally out of the way until the repair has been made and the curing operation with a steam chest such as that disclosed in my prior copending application and its parent application has been used or if a chemical repair process is being used, the electromagnet would be out of the way until the material forming the patch or repair has been cured. After the repair or splice has been completed, the electromagnet is again moved into alignment with the body 72 and the electromagnet energized after which the hose is then reeled back onto a single reel with the electromagnet and the assemblies 12 and 16 being held stationary thus removing the splicing apparatus from the hose.

The foregoing is considered as illustrative only of the principles of the invention. Further since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A hose splicing apparatus comprising an expansible member for insertion into an elongated hose in bridging relation to a repair area or splice, means associated with said expansible member for expanding it into engagement with the interior of the hose to exert pressure thereon during the caring of the repair or splice, said expansible member and expanding means being self contained and peripherally enclosed by the hose and remote from an open end thereof, said expansible member and expanding means having dimensional characteristics enabling movement longitudinally in the hose when the expansible member is unexpanded, and means disposed exteriorly of the hose for exerting a longitudinal force on the expansible member and expanding means through the hose wall without direct engagement or contact therewith to enable controlled relative longitudinal movement between the hose and the expansible member and expanding means so that the expansible member and expanding means may move longitudinally in relation to the hose at any point along its length.

2. A hose splicing apparatus comprising an expansible member for insertion into a hose in bridging relation to a repair area or splice, means associated with said expansible member for expanding it into engagement with the interior of the hose to exert pressure thereon during the curing of the repair or splice, said expansible member and expanding means having dimensional characteristics enabling movement longitudinally in the hose when the expansible member is unexpanded, and means disposed exteriorly of the hose for exerting a longitudinal force on the expansible member and expanding means to enable relative longitudinal movement between the hose and the expansible member and expanding means so that the expansible member and expanding means may move longitudinally in relation to the hose, said means exteriorly of the hose including magnetic means, said expansible member and expanding means interiorly of the hose including means subject to magnetic attraction in order to provide a constant relationship of the magnetic means exteriorly of the hose and the expansible member and expanding means interiorly of the hose for enabling relative movement of the hose thereto.

3. The structure as defined in claim 2 wherein said magnetic means includes an electromagnet encircling the hose, said electromagnet including a coil winding, said means interiorly of the hose subject to magnetic attraction including a metal body of ferrous material forming a core for the electromagnet that will be retained in constant relation to the coil winding when the coil winding is energized.

4. The structure as defined in claim 3 wherein said means for expanding the expansible member includes an air pressure tank connected to the expansible member, a manually operable control valve connecting the tank with the expansible member, and a manually operable discharge valve operatively connected to the expansible member, said valves being operable from externally of the hose by deflecting a portion of the hose in the area of the valve for manipulation thereof.

5. The structure as defined in claim 4 wherein said expansible member includes an elongated tubular resilient member, a pair of end caps telescoping over the ends of the tubular member, internal end members in the tubular member and having tapering peripheral surfaces, means interconnecting the end members for moving them longitudinally in relation to each other to rigidly secure the tubular member to the end caps and to enable replacement of the tubular member.

6. The structure as defined in claim 5 wherein said expansible member is rigidly connected to said air tank in longitudinal alignment therewith.

7. The apparatus as defined in claim 1 wherein said self-contained expansible member and expanding means include control means for selectively expanding and contracting said expansible member, said control means being actuated from exteriorly of the hose without direct engagement or contact therewith and without gaining access thereto from a remote open end of the hose, said control means being manually actuated with said hose being sufficiently flexible to enable manual actuation of the control means by peripherally collapsing the hose.

8. An apparatus for applying internal pressure to the peripheral wall of an enclosed space comprising an expandible member movable in said space and expandible into engagement with the wall, said expandible member including means selectively expanding said expandible member, and means disposed exteriorly of the wall to control the relative position of the expandible member and wall when the expandible member is unexpanded, said means disposed exteriorly of the wall including magnetic means and said expandible means including means subject to magnetic forces whereby the expandible member and magnetic means will maintain a predetermined relation on opposite sides of the wall.

9. The structure as defined in claim 8 wherein said means selectively expanding said expandible member includes actuating means interiorly of the space and being actuatable from exteriorly of the space.

10. The structure as defined in claim 8 wherein said expandible member includes a flexible resilient pressure expansible tubular member, a pressure tank connected with the tubular member, said means selectively expanding said expandible member including control valve means, said control valve means being disposed within the space and operable from exteriorly of the space.

* * * * *